United States Patent
Kotani et al.

(10) Patent No.: US 10,293,322 B2
(45) Date of Patent: May 21, 2019

(54) DESKTOP CONTINUOUS STIRRED TANK REACTOR

(71) Applicants: MAK ENGINEERING CORPORATION, Okayama (JP); RIGAKU KOBO, LLC, Shiga (JP)

(72) Inventors: Isao Kotani, Okayama (JP); Nobuyuki Nakayama, Shiga (JP)

(73) Assignees: MAK ENGINEERING CORPORATION, Okayama (JP); RIGAKU KOBO, LLC, Shiga (JP)

( * ) Notice: Subject to any disclaimer, the term of this patent is extended or adjusted under 35 U.S.C. 154(b) by 0 days.

(21) Appl. No.: 15/969,972

(22) Filed: May 3, 2018

(65) Prior Publication Data

US 2018/0326383 A1    Nov. 15, 2018

(30) Foreign Application Priority Data

May 12, 2017    (JP) ................................. 2017-095831

(51) Int. Cl.
*B01F 13/08*    (2006.01)
*B01F 13/10*    (2006.01)
(Continued)

(52) U.S. Cl.
CPC ............. *B01J 8/10* (2013.01); *B01F 13/0818* (2013.01); *B01F 13/1022* (2013.01);
(Continued)

(58) Field of Classification Search
CPC ...... B01F 13/00; B01F 13/08; B01F 13/0818; B01F 13/10; B01F 13/1013; B01F 13/1022; B01J 8/00; B01J 8/08; B01J 8/10; B01J 19/0053; B01J 19/0066; B01J 19/18; B01J 19/1812; B01J 19/1825; B01J 2219/00–2219/00004; B01J 2219/00274; B01J 2219/00277; B01J 2219/00479;
(Continued)

(56) References Cited

U.S. PATENT DOCUMENTS

| 6,893,613 B2 * | 5/2005 | Ruediger ............. B01J 19/0046 |
| | | 422/129 |
| 2009/0092989 A1 | 4/2009 | Chang et al. |

FOREIGN PATENT DOCUMENTS

| JP | 2009-279468 A | 12/2009 |
| JP | 2011-500025 A | 1/2011 |

OTHER PUBLICATIONS

Mo, et al., A miniature CSTR cascade for continuous flow of reactions containing solids, React. Chem. Eng., 2016, 1, 501-507.
(Continued)

*Primary Examiner* — Natasha E Young
(74) *Attorney, Agent, or Firm* — Pearne & Gordon LLP (57) ABSTRACT

A compact desktop continuous stirred tank reactor easily used on a magnetic stirrer is provided. A desktop continuous stirred tank reactor used on a magnetic stirrer includes a plurality of containers, each of the plurality of containers having a bottom and a shape capable of containing a stir bar, the plurality of containers being configured as a single unit member. The plurality of containers is arranged on the circumference of a circle of rotation of a pair of magnets of the magnetic stirrer or inside the circumference, and adjacent containers communicate through communication holes.

4 Claims, 8 Drawing Sheets

(51) Int. Cl.
*B01J 8/10* (2006.01)
*B01J 19/18* (2006.01)
*B01L 3/00* (2006.01)
*B01J 19/00* (2006.01)

(52) U.S. Cl.
CPC ....... *B01J 19/0066* (2013.01); *B01J 19/1825* (2013.01); *B01L 3/00* (2013.01); *B01J 2219/00004* (2013.01); *B01J 2219/0074* (2013.01); *B01J 2219/00479* (2013.01)

(58) Field of Classification Search
CPC ...... B01J 2219/00718; B01J 2219/0072; B01J 2219/0074; B01L 3/00
See application file for complete search history.

(56) References Cited

OTHER PUBLICATIONS

Browne, et al., Continuous Flow Processing of Slurries: Evaluation of an Agitated Cell Reactor, Org. Process Res. Dev. 2011, 15, 693-697.

* cited by examiner

DESKTOP CONTINUOUS STIRRED TANK REACTOR

This application claims priority to Japanese Patent Application No. 2017-095831, filed in May 12, 2017, the disclosure of which is hereby incorporated in their entirety by reference.

TECHNICAL FIELD

The present disclosure relates to a desktop continuous stirred tank reactor for use on a magnetic stirrer.

BACKGROUND

In the chemical industry, continuous reactors are often used to efficiently produce desired chemical substances. The known continuous reactors are a tubular reactor in which a reaction takes place while fluids flow in tubes, and a continuous tank reactor in which a plurality of stirred tanks is connected and fluids are stirred in each reaction tank to react.

Regarding the tubular reactor, for example, as disclosed in JP 2009-279468 A, many small tubular reactors have been developed. Such a tubular reactor is called a microreactor.

When a batch type reaction is conducted, for example, a plate having a plurality of small holes called microwells as illustrated in FIG. 12 of JP 2011-500025 A is used. The plate illustrated in FIG. 12 of JP 2011-500025 A is used for amplifying genes by PCR (Polymerase Chain Reaction).

SUMMARY

A small tubular reactor as disclosed in JP 2009-279468 A can be used on a desk and is convenient, but has the following problems. For example, when a particulate compound is used or when a reaction is carried out and solids are precipitated, a pipeline tends to clog easily. When gas is generated in the process of a reaction, reactants and so on flowing in the pipeline are pushed out by the gas. Consequently, the reaction may not proceed as designed.

In a continuous tank reactor, the above problems peculiar to tubular reactors are unlikely to occur. However, no small continuous tank reactor that is easy to use has been developed.

The plate as shown in JP 2011-500025 A is for carrying out a batch type reaction. Therefore, it is impossible to obtain reaction products efficiently, and it is also impossible to study the conditions of continuous reactions at a small scale.

It is an object of the present disclosure to provide a compact continuous stirred tank reactor that can be easily used on a magnetic stirrer.

The above problems are solved by a desktop continuous stirred tank reactor used on a magnetic stirrer. The desktop continuous stirred tank reactor includes a plurality of containers, each of the plurality of containers having a bottom, each of the plurality of containers having a shape capable of containing a stir bar, the plurality of containers being configured as a single unit member, wherein the plurality of containers are arranged on a circumference of a circle of rotation of a pair of magnets of the magnetic stirrer or inside the circumference, and adjacent containers are communicated through communication holes.

In the above desktop continuous stirred tank reactor, since a plurality of containers, each having a bottom, are arranged on the circumference of a circle of rotation of a pair of magnets of the magnetic stirrer or inside the circumference, it is possible to rotate the plurality of stir bars contained in the plurality of containers by the pair of magnets of the magnetic stirrer. This desktop continuous stirred tank reactor can be easily used without the need to prepare a special device or a special magnetic stirrer having a plurality of magnets for activating the stir bars.

It is preferable that the above desktop continuous stirred tank reactor have a block-shaped main body and a plurality of holes provided in the main body, each of the plurality of holes having a bottom, and the plurality of holes function as the plurality of containers. By providing the plurality of holes in the block-shaped main body, it is possible to easily form the plurality of containers as a single unit.

It is preferable that the above desktop continuous stirred tank reactor include a lid for closing openings of the plurality of holes, and the lid have a through hole for communicating the holes with the outside of the lid. By providing the through hole in the lid for communicating the holes with the outside of the lid, for example, it is possible to easily supply a reactant, a catalyst, a reaction auxiliary agent, and a solvent into the reactor from the outside of the reactor via the through hole, and it is possible to easily take the product generated by a reaction out of the reactor via the through hole.

It is preferable that the above desktop continuous stirred tank reactor include a lid for closing openings of the plurality of holes, the lid have a connecting part for connection with other laboratory equipment, and the connecting part communicate with at least one of the plurality of containers. By providing the lid with the connecting part, it is possible to connect other laboratory equipment to the desktop continuous stirred tank reactor. Consequently, it is possible to use the desktop continuous stirred tank reactor, for example, in an application where pre-treatment is carried out in other laboratory equipment and then the pre-treated substance is sent to the desktop continuous stirred tank reactor for reaction, or an application where a reaction is carried out in the desktop continuous stirred tank reactor and then the reaction product is sent to other laboratory equipment for post-treatment.

According to the present disclosure, it is possible to provide a compact desktop continuous stirred tank reactor that can be easily used on a magnetic stirrer.

DETAILED DESCRIPTION OF THE EMBODIMENTS

One embodiment of the present disclosure will be described with reference to the drawings. The following embodiment is merely an example of the present disclosure, and the technical scope of the present disclosure is not limited to the following embodiment.

FIG. 1 to FIG. 6 illustrate one embodiment of a desktop continuous stirred tank reactor (hereinafter simply referred to as a reactor) of the present disclosure.

Figure 3:
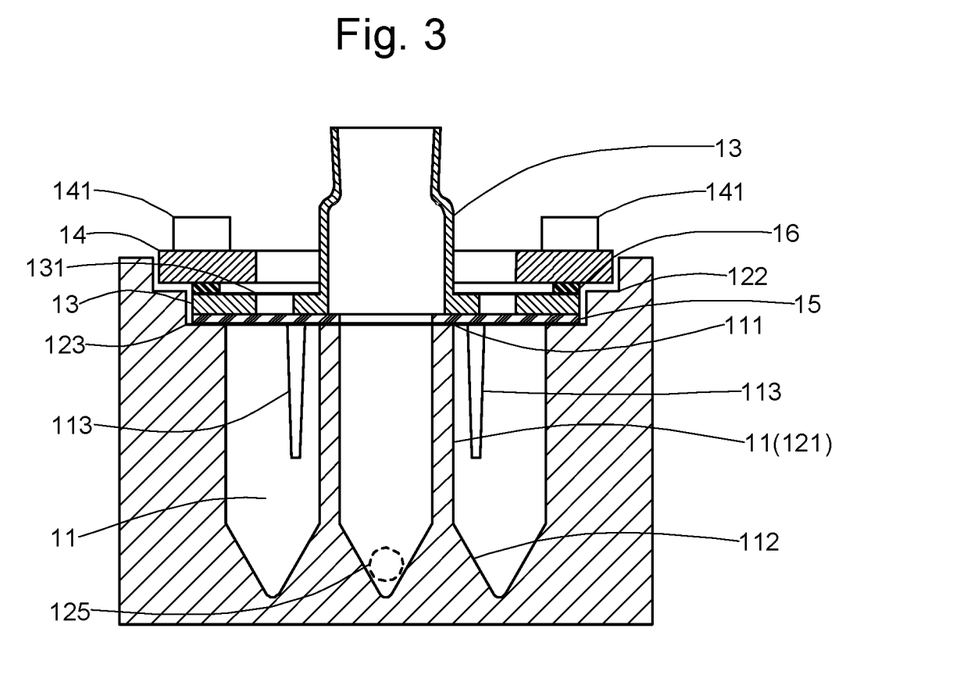
FIG. 3 is a cross-sectional view taken along the H-H' portion of FIG. 2.
Figure 4:
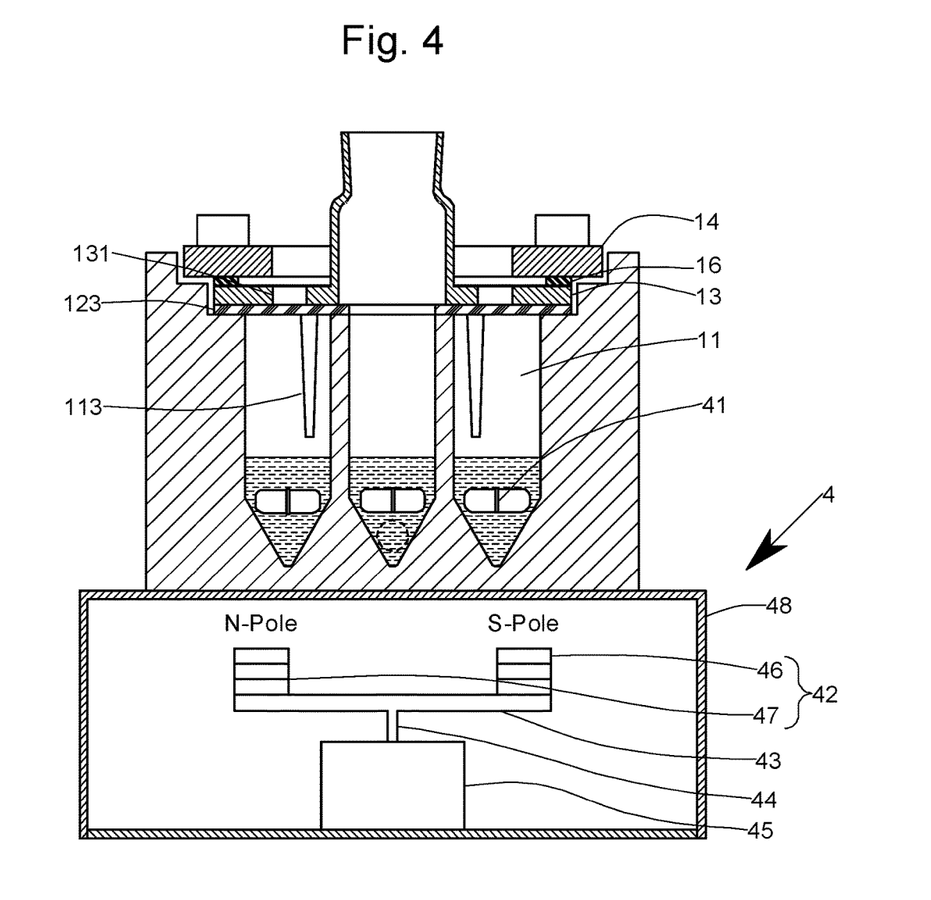
FIG. 4 is a cross-sectional view illustrating a state in which the desktop continuously stirred tank reactor of FIG. 1 is placed on a magnetic stirrer.

A reactor 1 of this embodiment is a reactor 1 used on a magnetic stirrer 4 as illustrated in FIG. 4. This reactor 1 includes a plurality of containers 11, each of the containers 11 having a bottom. As illustrated in FIG. 3, each of the containers 11 has an opening 111 on the top side, and is closed with a bottom portion 112 on the bottom side. As illustrated in FIG. 4, each of the containers 11 has a shape capable of containing a magnetic stir bar 41. As illustrated in FIG. 4, each of the containers 11 has such a shape that, when the stir bar 41 is inserted from the opening 111 on the flat side, the stir bar 41 stays on the bottom portion 112.

Figure 1:
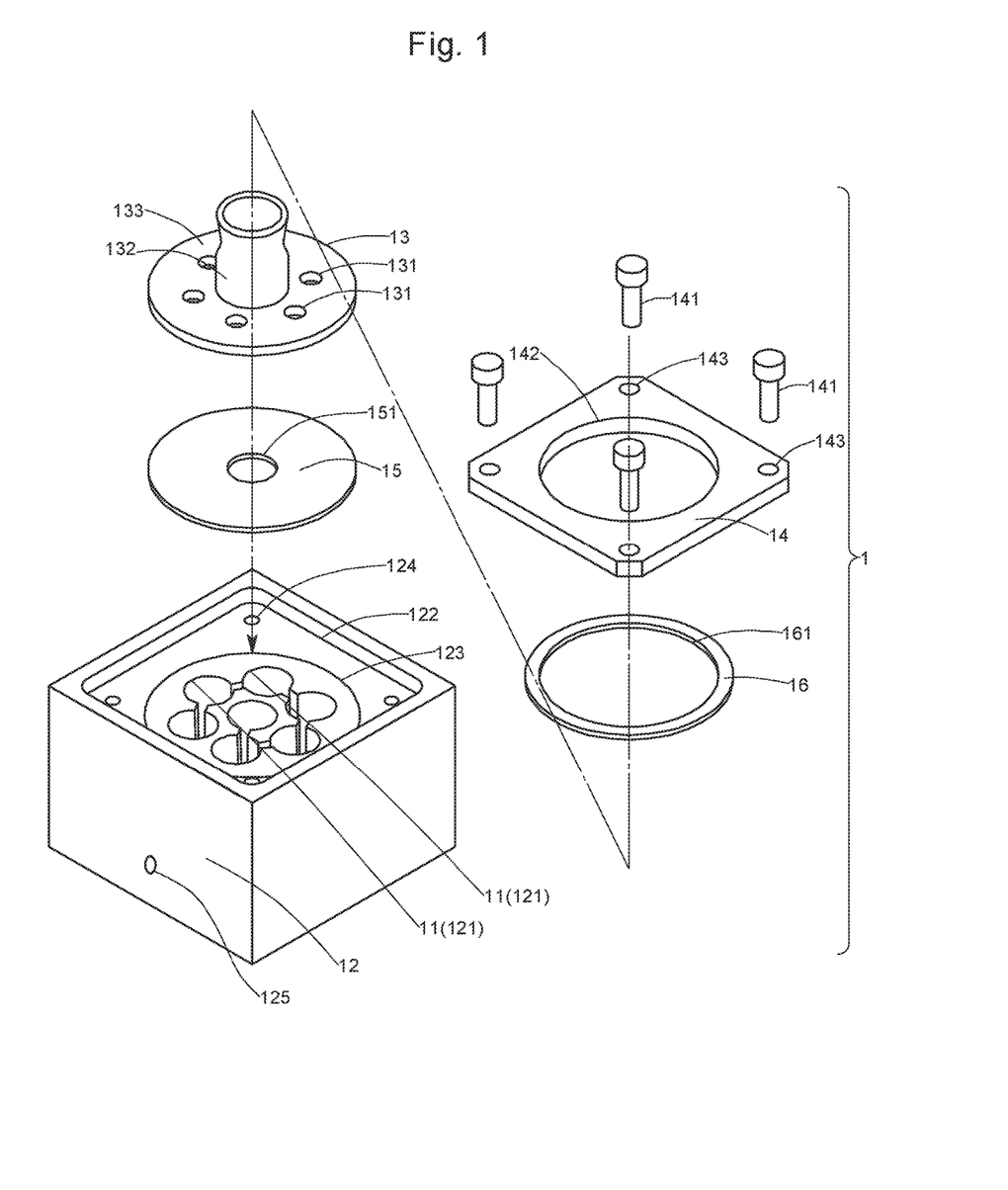
FIG. 1 is an exploded perspective view illustrating one embodiment of a desktop continuous stirred tank reactor.

As illustrated in FIG. 1 and FIG. 3, in the reactor 1 of this embodiment, the plurality of containers 11 are configured as a single unit member. Therefore, it is unnecessary to perform the operation of moving the individual containers separately onto the magnetic stirrer 4. A single operation is sufficient to move the plurality of containers 11 onto the magnetic stirrer 4.

In the reactor 1 of this embodiment, the containers 11 have a block-shaped main body 12 and a plurality of holes 121 provided in the main body 12, each of the holes 121 having a bottom. The plurality of holes 121 function as the containers 11, each of the containers 11 having a bottom. For example, a user can easily move the plurality of containers 11 onto the magnetic stirrer 4 with a single operation by holding the block-shaped main body 12 with hands and putting it on the magnetic stirrer 4.

In the reactor 1 of this embodiment, as illustrated in FIG. 4, the plurality of containers 11 are arranged on the circumference of a circle of rotation of a pair of magnets of one magnetic stirrer 4, or inside the circumference.

The magnetic stirrer 4 illustrated in FIG. 4 has a pair of magnets 42, a support body 43 for fixing the pair of magnets 42, a shaft 44 connected to the support body 43, a drive source 45 for rotating the shaft 44, and a housing 48 containing these members.

The pair of magnets 42 includes a magnet 46 on the S-pole side and a magnet 47 on the N-pole side. Each of the S-pole-side magnet 46 and the N-pole-side magnet 47 is formed by stacking a plurality of magnets. The S-pole-side magnet 46 and the N-pole-side magnet 47 are fixed to one end and the other end of the support body 43, respectively.

As described above, the support body 43 is a table or a rod on which the S-pole-side magnet 46 and the N-pole-side magnet 47 are fixed. The shaft 44 is connected to the middle of the support body 43. The shaft 44 is rotatably connected to the drive source 45 such as a motor. With the power supplied from the drive source 45, the shaft 44, the support body 43, and the pair of magnets 42 rotate. The orbit of the rotating pair of magnets 42 is a circle.

As described above, the plurality of containers 11 are arranged on the circumference of a circle of rotation of the pair of magnets 42, or inside the circumference. Therefore, each of the stir bars 41 contained in the plurality of containers 11 rotates with the rotation of the pair of magnets 42 of the magnetic stirrer 4. Thus, in the reactor 1 of this embodiment, the respective stir bars 41 contained in the plurality of containers 11 can be rotated at a time by one magnetic stirrer 4. It is therefore unnecessary to dispose a plurality of magnetic stirrers under the corresponding containers 11, and the operation is simple. As described above, since the plurality of containers 11 are configured as a single unit, the operation to be performed by the user to rotate the stir bars 41 of the plurality of containers 11 is just placing the reactor 1 on one magnetic stirrer 4.

As illustrated in FIG. 1 and FIG. 4, the reactor 1 of this embodiment has a lid 13 for closing the openings 111 of the plurality of holes 121. The lid 13 has a through hole 131 for communicating the hole 121 with the outside of the lid 13. In the reactor 1 of this embodiment, the through holes 131 are located above the plurality of holes 121 when the lid 13 is closed. The number of the through holes 131 corresponds to the number of the plurality of holes 121.

Figure 5:
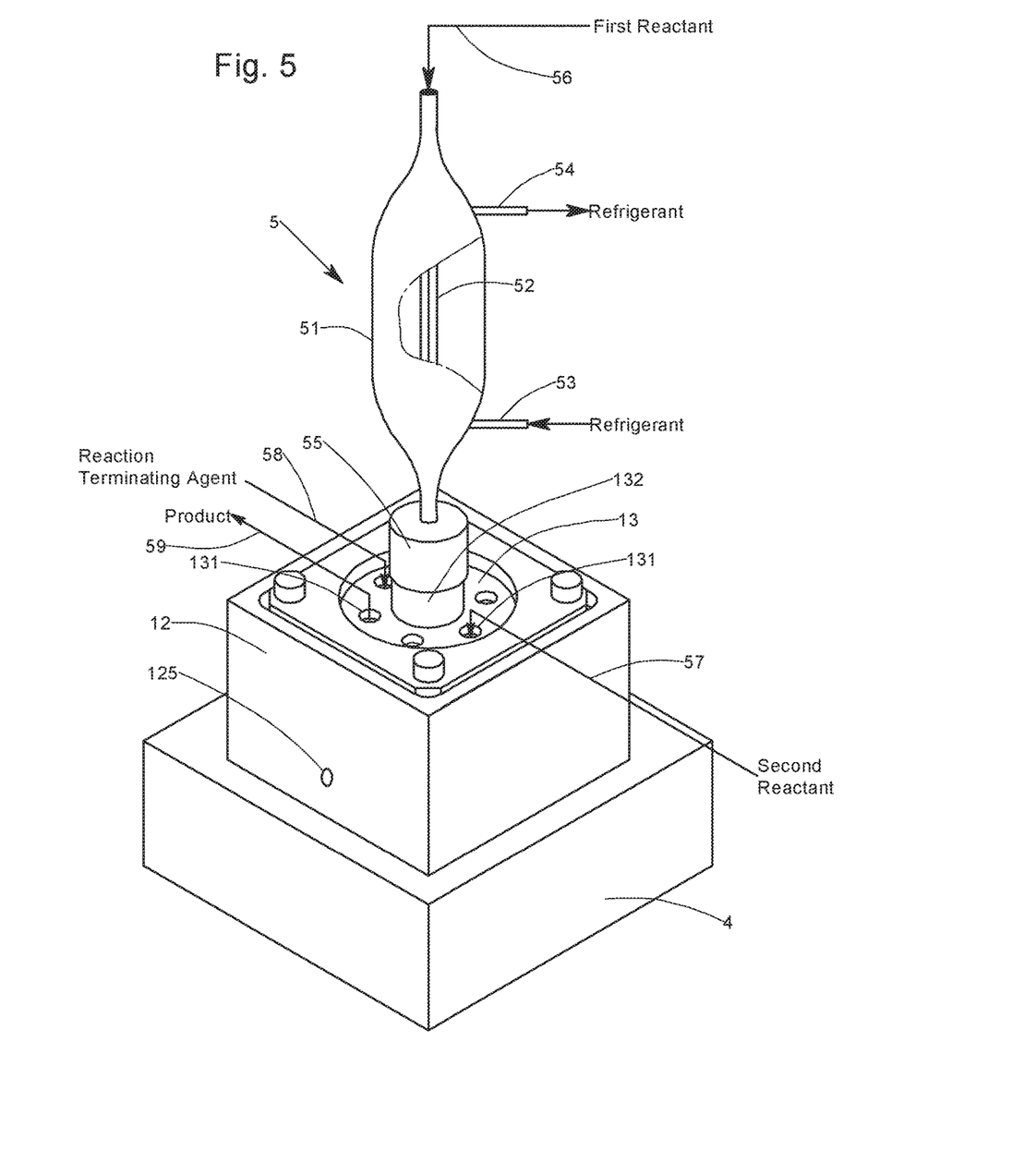
FIG. 5 is a perspective view illustrating a state in which the desktop continuous stirred tank reactor of FIG. 1 is connected to other laboratory equipment.

As will be described later with reference to FIG. 5, the through hole 131 functions as a supply port for supplying an arbitrary substance, such as a reactant, a catalyst, a reaction auxiliary agent and a solvent, into the reactor 1, and functions as a discharge port for removing an arbitrary substance such as a product resulting from a reaction. Additionally, it is possible to use the through holes 131 when sampling is performed to find whether or not the reaction is progressing as designed in the plurality of holes 121.

As described with reference to FIG. 5, the lid 13 of the reactor 1 of this embodiment is provided with a connecting part 132 for connection with other laboratory equipment 5. The connecting part 132 communicates the other laboratory equipment 5 with at least one of the plurality of containers 11. Therefore, it is possible to supply a substance pre-treated in the other laboratory equipment 5 to the container 11 of the reactor 1, or it is possible to supply a substance obtained by a reaction in the reactor 1 to the other laboratory equipment 5 for post-treatment.

The following will describe in further detail the configuration of the reactor 1 of this embodiment.

Figure 2:
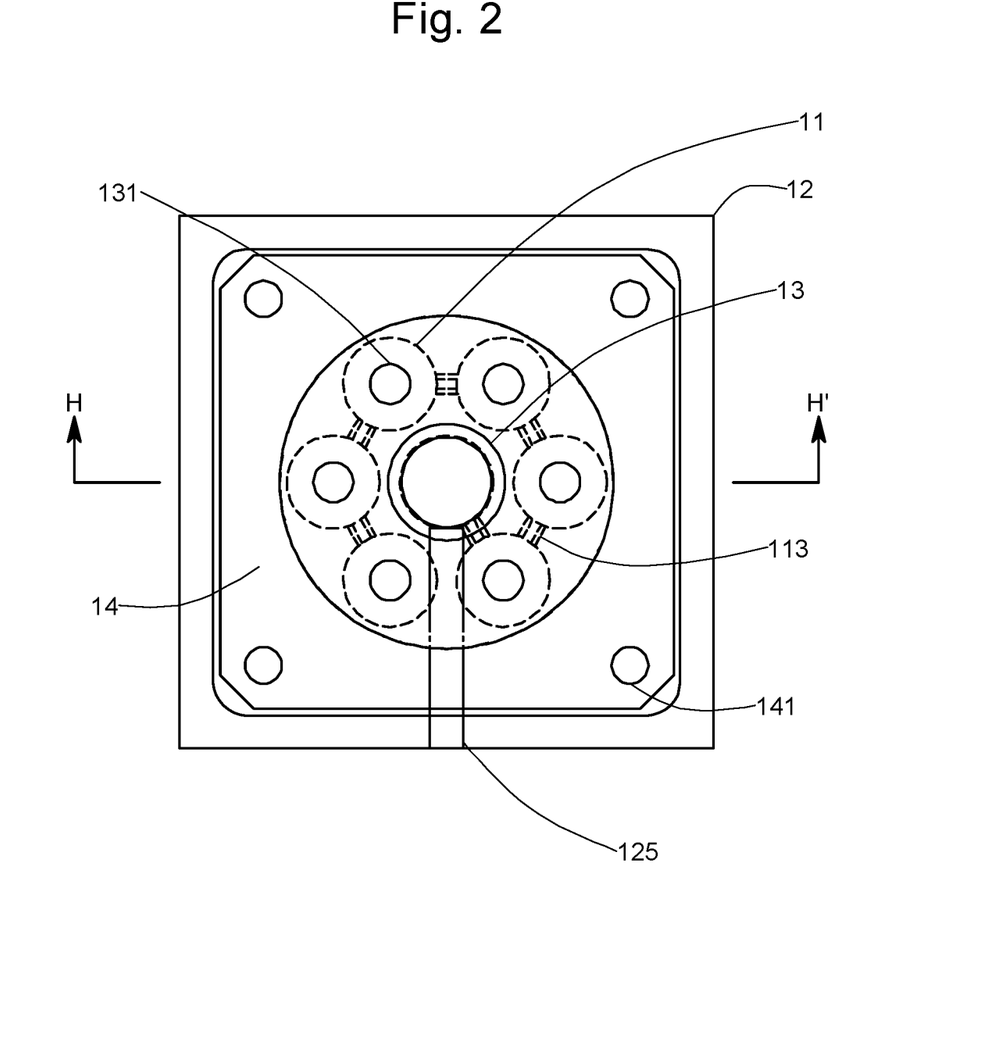
FIG. 2 is a plan view illustrating a state in which the desktop continuously stirred tank reactor of FIG. 1 is assembled.

As illustrated in FIG. 1 to FIG. 3, the reactor 1 of this embodiment has: the main body 12 including the plurality of holes 121; the lid 13 including a flange 133, the cylindrical connecting part 132 with openings at both ends, and the plurality of through holes 131; a fixing part 14 for fixing the lid 13 to the main body 12; an elastic member 15 arranged between the lid 13 and the main body 12; and a cushioning member 16 placed between the lid 13 and the fixing part 14.

The main body 12 is a box-like hexahedron and has, on a flat surface side, a first concave portion 122, a second concave portion 123, and a plurality of holes 121 provided in the second concave portion 123. The first concave portion 122 is a substantially rectangular flat surface in a planar view and forms a gap for receiving the fixing part 14. The shape of the first concave portion 122 may be any shape as long as it can receive the fixing part 14. The first concave portion 122 is provided with a plurality of screw holes 124 into which screws inserted through the fixing part 14 are screwed.

The second concave portion 123 is provided inside the first concave portion 122. The second concave portion 123 is a substantially circular flat surface in a planar view. The second concave portion 123 forms a gap for receiving the elastic member 15 having a substantially circular shape in a planar view and the lid 13 having a substantially circular shape in a planar view. The shape of the second concave portion 123 may be any shape as long as it can receive the elastic member 15 and the lid 13.

In the second concave portion 123, the plurality of holes 121 are provided. The plurality of holes 121 extend toward the bottom surface side of the main body 12, and have a wall portion and a closed bottom portion. As illustrated in FIG. 3, the bottom portion is in the shape of a cone so that even when the amount of liquid introduced into the hole 121 is small, the level of liquid surface is high and the stir bar 41 is not exposed from the liquid surface. The shape of the hole 121 is substantially circular in a planar view, and is rectangular having a con at a lower portion in cross sectional view. When the stir bar 41 is rotated, a substantially circular swirling flow is easily generated and therefore solids hardly remain in the corners.

A communication hole 113 extending from the opening 111 toward the bottom portion 112 is provided in the wall portion of the plurality of holes 121. As illustrated in FIG. 1 and FIG. 2, the communication holes 113 allow adjacent holes 11 to communicate with each other. The communication hole 113 has a shape that does not reach the bottom portion 112. Therefore, only the liquid exceeding the level of the lower end of the communication hole 113 moves from the hole on the upstream side to the hole on the downstream side. In other words, since a large amount of liquid does not move from the hole on the upstream side to the hole on the downstream side at a time, the liquid is stirred sufficiently by the stir bar 41 in each hole and then moves toward the hole 11 on the downstream side. In FIG. 2, the holes 11 and the communication holes 113 hidden by the lid 13 are shown by the broken lines.

The shape of the communication hole 113 is a so-called tapered shape with the opening width decreasing from the opening 111 toward the bottom portion 112. Thus, even if solids are precipitated in the liquid, the solids hardly adhere to the edge of the communication hole 113, thereby preventing clogging of the communication hole 113.

As illustrated by the dashed line in FIG. 2 and the broken line in FIG. 3, the main body 12 may be provided with a pipeline 125 that allows insertion of a detection tool, such as a temperature sensor, a thermometer and a pH meter. The pipeline 125 may be configured to communicate with at least one of the plurality of containers 11. It is preferable that the pipeline 125 be placed adjacent to the containers 11 to measure the temperatures of the plurality of containers 11.

In the reactor 1 of this embodiment, the main body 12 is made of block-shaped stainless steel, and the plurality of containers 11 are configured by cutting the plurality of holes 11 so as not to penetrate through the main body 12. Therefore, the plurality of containers 11 are made of stainless steel. Stainless steel has high thermal conductivity and is capable of easily heating liquid introduced into the plurality of containers 11 with the use of a hot plate stirrer or the like. Hence, stainless steel can be suitably used when a reaction that requires heating is conducted. Moreover, stainless steel is preferable because it does not readily corrode and has excellent durability. Thus, stainless steel can be suitably used when corrosive reactants, catalysts and reaction products are handled.

The material constituting the plurality of containers 11 is not limited to stainless steel, and the plurality of containers 11 may be made of, for example, glass, a plastic material, and other metal materials. A method of forming a plurality of containers, each of the containers having a bottom, is not limited to the cutting of stainless steel, and is, for example, injection molding of plastic material, cutting of plastic material, and cutting of glass material such as quartz glass.

In the reactor 1 according to this embodiment, as illustrated in FIG. 2, a hole 11 is positioned in the middle of the main body 12 in a planar view, and holes 11 are arranged at the corners of the hexagon to surround the hole 11. The arrangement pattern of the plurality of holes 11 is not particularly limited as long as the holes 11 are arranged on the circumference of a circle of rotation of the pair of magnets 42, or inside the circumference. The arrangement pattern of the plurality of holes 11 can be, for example, a substantially circular shape, or the shape of a polygon having three or more sides, such as a triangle, a quadrangle, and a pentagon. In a planar view, the plurality of holes are arranged preferably on the circumference of a circle with a diameter of 80 cm or less or inside the circumference with the center of the main body as the center of the circle, more preferably on the circumference of a circle with a diameter of 50 cm or less or inside the circumference, and even more preferably on the circumference of a circle with a diameter of 30 cm or less or inside the circumference. Further, the diameter of the circle is preferably 1 cm or more.

The elastic member 15 buffers the lid 13 and the main body 12 and prevents damage when the main body 12 and the lid 13 are strongly pressed. It is possible to give liquid-tightness and air-tightness to the plurality of holes 121 by using the elastic member 15. For example, in the case where a reaction that generates harmful gas progresses in the plurality of holes 121, it is preferable to use the elastic member 15. The elastic member 15 preferably has a shape that prevents the lid 13 from making direct contact with the main body 12. In the reactor 1 of this embodiment, the elastic member 15 is substantially circular in a planar view and has, in the middle, a through hole 151 communicating with the opening of the cylindrical connecting part 132 and one of the plurality of holes 121.

The lid 13 includes the cylindrical connecting part 132 having openings at both ends, the flange 133 projecting in a direction intersecting the axial direction of the connecting part 132, and the plurality of through holes 131 provided in the flange 133. As described above, the through hole 131 functions as a supply port for supplying an arbitrary substance such as a reactant into the reactor 1, and functions as a discharge port for removing an arbitrary substance such as the product generated by a reaction. In the reactor 1 of this embodiment, the lid 13 is made of borosilicate glass, but it may be made of, for example, various types of fluorocarbon polymers such as Teflon (registered trademark) or other synthetic resin materials.

As illustrated in FIG. 3, the through hole 131 is closed with the above-described elastic member 15. However, as illustrated in FIG. 5, by inserting needles attached to the distal ends of pipelines 57, 58, 59 connected to liquid feeding tools or suction tools, such as syringe pumps, into the elastic member 15 via the through holes 131, it is possible to communicate the plurality of holes 121 with the pipelines 57, 58, 59. Since the elastic member 15 is elastically deformed to close the needle hole by its elasticity, it is possible to prevent a significant decrease in air-tightness and liquid-tightness after the needle is inserted or removed. The elastic member 15 is preferably configured by a laminate of an elastic material, such as a silicone resin, and a thin film of various types of fluorocarbon polymers, such as Teflon (registered trademark), or other corrosion resistant synthetic resins. It is possible to close the needle hole with the elastic material such as a silicone resin, and it is also possible to protect the elastic material such as a silicone resin from erosion with a thin film of various types of fluorocarbon polymers such as Teflon (registered trademark) having high chemical resistance, or a thin film of other corrosion-resistant synthetic resins.

The fixing part 14 is a member for fixing the lid 13 to the main body 12. The fixing part 14 may be of any kind as long as it can fix the lid 13. As the fixing part 14, the reactor 1 of this embodiment uses a member having a substantially rectangular shape in a planar view and a plate form in a side view, and including a through hole 142 in the middle through which the cylindrical connecting part 132 can be inserted and a plurality of screw holes 143 through which screws can be inserted. The cushioning member 16 with a through hole 161 which the cylindrical connecting part 132 can be inserted through is arranged between the fixing part 14 and the lid 13. The cushioning member 16 is made of an annular elastic material and prevents damage when the lid 13 and the fixing part 14 are strongly pressed. The cushioning member 16 is preferably an elastic material such as a silicone resin.

Figure 7:
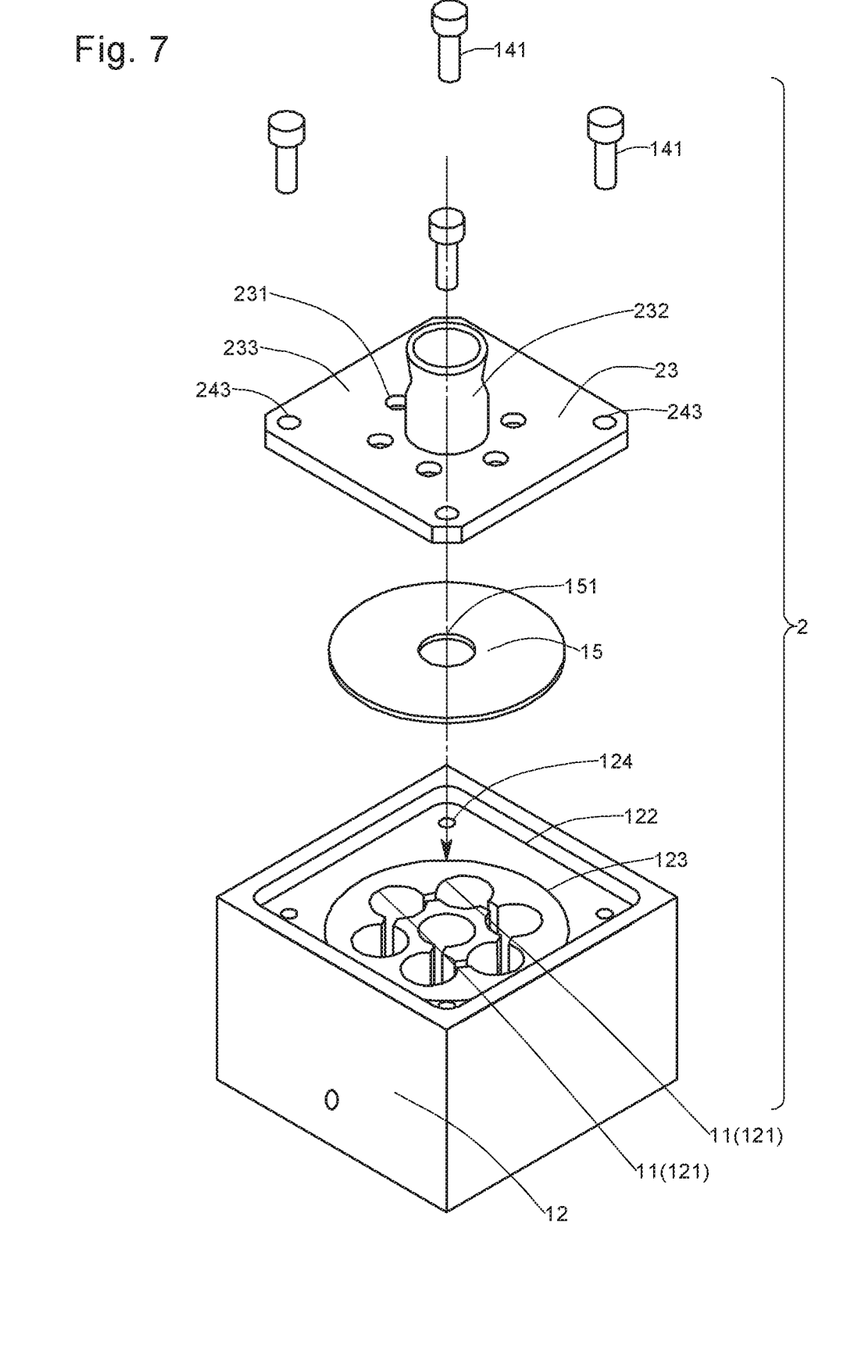
FIG. 7 is an exploded perspective view illustrating another embodiment of a desktop continuous stirred tank reactor.
Figure 8:
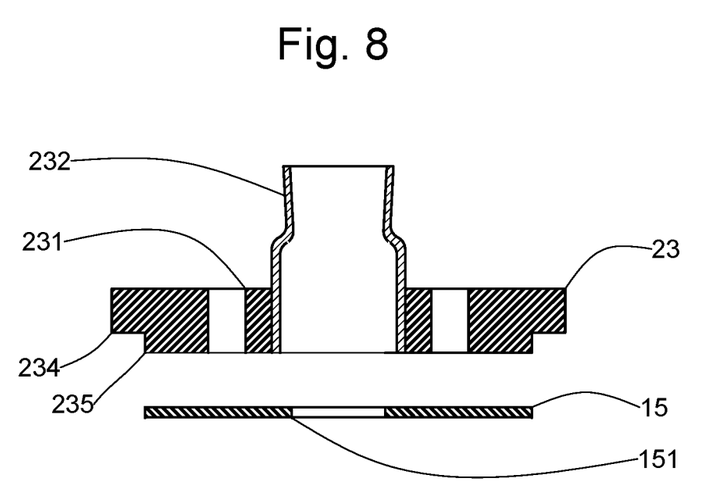
FIG. 8 is a cross sectional view of a lid of the desktop continuous stirred tank reactor of FIG. 7.

In the reactor 1 according to the above embodiment, the lid 13 and the fixing part 14 are configured as separate members. As illustrated in FIG. 7 and FIG. 8, the lid 13 and the fixing part 14 may be configured as a single unit member. In a reactor 2 illustrated in FIG. 7 and FIG. 8, the same reference numerals as those used in FIG. 1 to FIG. 6 are used for the same structures as those of the reactor 1 according to the above embodiment.

As is apparent from FIG. 7 and FIG. 8, the reactor 2 differs from the reactor 1 according to the above embodiment only in that the lid 13 and the fixing part 14 are configured as a single unit. A lid 23 illustrated in FIG. 7 and FIG. 8 includes a cylindrical connecting part 232, and a flange 233 projecting from the lower end portion of the connecting part 232 in a direction intersecting the axis of the connecting part. The flange 233 is substantially rectangular in a planar view, and has a plurality of through holes 231 and a plurality of screw holes 243.

The flange 233 includes a first convex portion 234 corresponding to the shape of the first concave portion 122 of the main body 12, a second convex portion 235 corresponding to the shape of the second concave portion 123 of the main body 12, the plurality of through holes 231 piercing the flange 233, and the plurality of screw holes 243. In a state in which the bottom surface of the second convex portion 235 is in contact with the flat surface of the second concave portion 123 of the main body 12, screws 141 can be screwed into the screw holes 124 of the main body 12 and the screw holes 243 of the flange 233 to fix the lid 23 to the main body 12. Similarly to the reactor 1 according to the above embodiment, the elastic member 15 is placed between the lid 23 and the main body 12.

The lid 23 illustrated in FIG. 7 and FIG. 8 is preferable because it is composed of a small number of members, and thus the lid 23 can be fixed to the main body in fewer steps.

The material constituting the lid 23 is not particularly limited. However, it is preferable, for example, that the connecting part 232 be made of a glass material, and the flange 233 be made of various types of fluorocarbon polymers, such as a Teflon (registered trademark) resin, or other synthetic resin materials. The connecting part 232 and the flange 233 only have to be connected by fitting etc.

A method of using a reactor will be described hereinafter by giving an application example of the reactor 1.

Figure 6:
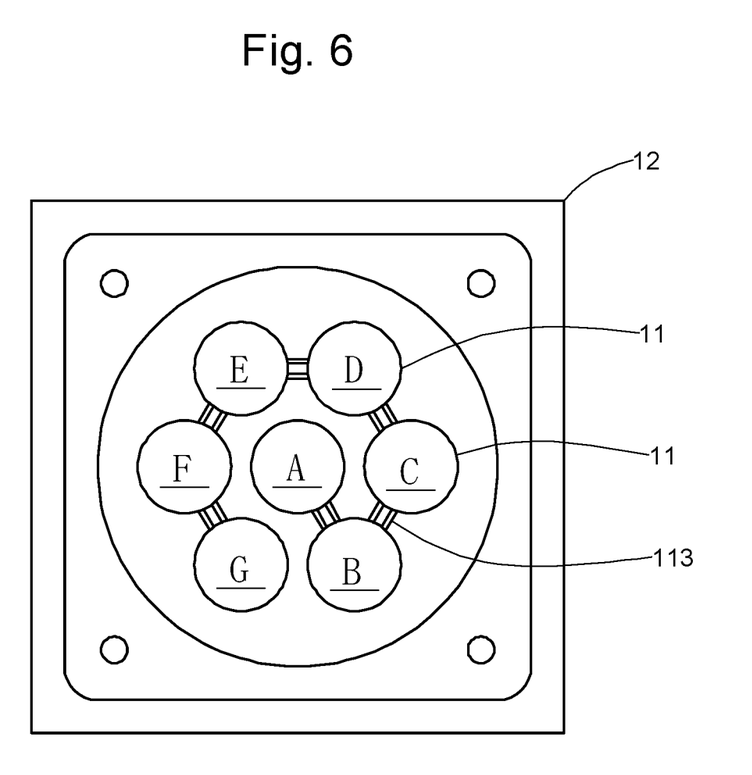
FIG. 6 is an explanatory view illustrating the positions of the containers of the desktop continuous stirred tank reactor of FIG. 1.

In the reactor 1, as illustrated in FIG. 6, the plurality of holes 11 are arranged at a position A in the middle of the main body 12 and corner positions B to G of a hexagonal shape to surround the position A in a planar view. Hereinafter, the hole at the position A will be referred to as the "hole A" and the same for positions B to G.

The hole A communicates with the hole B, the hole B communicates with the hole C, the hole C communicates with the hole D, the hole D communicates with the hole E, the hole E communicates with the hole F, and the hole F communicates with the hole G. In the case where liquid is supplied from the hole A, the liquid flows from the hole A as the start point, until it reaches the hole G as the terminal point, in the order of A, B, C, D, E, F and G, and the reaction proceeds. Conversely, when the hole G is the start point, the hole A is the terminal point. The following application example will describe an example in which the hole A is the start point.

In this application example, ether is synthesized by carrying out a chemical reaction shown in the following Chemical Formula 1 and a chemical reaction shown in the following Chemical Formula 2 in the reactor 1. R represents an arbitrary alkyl group. In Chemical Formula 2, BnCl represents benzyl chloride, and Bn represents benzyl group. In both Chemical Formula 1 and Chemical Formula 2, tetrahydrofuran is used as a solvent.

R—OH+NaH→R—ONa+H₂         [Chemical Formula 1]

R—ONa+BnCl→R—O—Bn+NaCl         [Chemical Formula 2]

As illustrated in FIG. 4, the reactor 1 is placed on the magnetic stirrer 4 so that the plurality of holes 11 are positioned inside the circumference of a circle of rotation of the pair of magnets 42 of the magnetic stirrer 4. Next, one stir bar 41 is placed in each of the hole A to hole F, and tetrahydrofuran and sodium hydride (NaH) are put in the hole A. In this state, the elastic member 15, the lid 13, the cushioning member 16, and the fixing part 14 are stacked in this order on the main body 12, and fixed with the screws 141. A connecting part 55 of a Liebig condenser as other laboratory equipment 5 is connected to the connecting part 132 of the lid 13. The condenser includes an outer cylinder 51, a hollow inner tube 52 configured so as not to communicate with the outer cylinder 51, an inlet port 53 for supplying a refrigerant between the outer cylinder 51 and the inner tube 52, and a discharge port 54 for discharging the refrigerant. By supplying the refrigerant through the inlet port 53, the refrigerant cools the inner tube 52, and, after performing heat exchange, the refrigerant is discharged from the discharge port 54. In FIG. 5, a state in which a part of the outer cylinder 51 is cut away is illustrated by the alternate long and short dash line. Both the outer cylinder and the inner tube are made of a glass material, such as borosilicate glass.

The above-described inner tube 52 communicates with the hole A illustrated in FIG. 6 through the connecting part 55. A pipeline 56 connected to a syringe pump (not illustrated) is inserted from the top of the inner tube 52. A needle is attached to the distal end of the pipeline 56, and this needle is inserted through the connecting part 132 of the lid 13 and the through hole 151 of the elastic member 15 and reaches the hole A. A mixed solution of R—OH and tetrahydrofuran as a first reactant is successively supplied from the pipeline 56 to the hole A by the syringe pump.

In the hole B, NaH introduced in the hole A and R—OH supplied from the pipeline are stirred by the stir bar 41, and the reaction shown in Chemical Formula 1 proceeds. A mixed solution of benzyl chloride and tetrahydrofuran is supplied as a second reactant to the hole C through the pipeline 57 by a syringe pump. A needle is attached to the distal end of the pipeline 57, and this needle is inserted through the through hole 131 of the lid 13 and the elastic member 15 and reaches the hole C.

In the hole D and the hole E illustrated in FIG. 6, benzyl chloride and R—ONa are stirred by the stir bars 41, and the reaction of Chemical Formula 2 proceeds. A hydrochloric acid solution is supplied as a reaction terminating agent to the hole F thorough the pipeline 58 by a syringe pump. A needle is attached to the distal end of the pipeline 58, and this needle is pierced through the through hole 131 of the lid 13 and the elastic member 15 and reaches the hole F.

When the hydrochloric acid is added and stirred by the stir bar 41 in the hole F, the reaction of Chemical Formula 2 is terminated. The liquid containing the product after the reaction flows into the hole G and is sucked and collected by a syringe pump that is a suction tool connected to the pipeline 59. A needle is attached to the distal end of the pipeline 59, and this needle is pierced through the through hole 131 of the lid 13 and the elastic member 15 and reaches the hole G.

The above reactions of Chemical Formula 1 and Chemical Formula 2 are carried out while heating with the magnetic stirrer 4 is performed. Since the reactor 1 is heated, tetrahydrofuran as a solvent evaporates and flows out from a gap between the distal end of the inner tube 52 and the pipeline 56. However, in this reactor 1, the vaporized tetrahydrofuran is cooled and condensed by the condenser. Thus, it is possible to prevent tetrahydrofuran from vaporizing and being lost.

The above application example showed an example in which the condenser is used as other laboratory equipment. Since the outer diameter of the connecting part 132 matches the standards and dimensions of other laboratory equipment, it is possible to connect and link the connecting part 132 with a variety of laboratory equipment.

REFERENCE SIGNS LIST

1 Desktop continuous stirred tank reactor
2 Desktop continuous stirred tank reactor (lid/fixing part integrated type)
4 Magnetic stirrer
11 Container
41 Stir bar
42 Pair of magnets
113 Communication hole
12 Main body
111 Opening
13 Lid
131 Through hole
132 Connecting part

What is claimed is:

1. A desktop continuous stirred tank reactor used on a magnetic stirrer,
   the desktop continuous stirred tank reactor comprising a plurality of containers, each of the plurality of containers having a bottom, each of the plurality of containers having a shape capable of containing a stir bar, the plurality of containers being configured as a single unit member, wherein
   the plurality of containers is arranged on a circumference of a circle of rotation of a pair of magnets of the magnetic stirrer or inside the circumference, and
   adjacent containers are communicated through communication holes.

2. The desktop continuous stirred tank reactor according to claim 1,
   comprising: a block-shaped main body; and a plurality of holes provided in the main body, each of the plurality of holes having a bottom; wherein the plurality of holes function as the plurality of containers.

3. The desktop continuous stirred tank reactor according to claim 1, comprising a lid for closing openings of a plurality of containers, the lid having a through hole for communicating the plurality of containers with the outside of the lid.

4. The desktop continuous stirred tank reactor according to claim 1, comprising a lid for closing openings of a plurality of containers, the lid having a connecting part for connection with other laboratory equipment, wherein the connecting part communicates with at least one of the plurality of containers.

\* \* \* \* \*